United States Patent
Theoduloz et al.

(10) Patent No.: US 9,742,271 B2
(45) Date of Patent: Aug. 22, 2017

(54) DC-DC CONVERTER WITH LOW START-UP POWER AND VOLTAGE

(71) Applicant: EM Microelectronic-Marin S.A., Marin (CH)

(72) Inventors: Yves Theoduloz, Yverdon (CH); Jerome Saby, Neuchatel (CH); Cyril Marti, Lignieres (CH)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 15/167,073

(22) Filed: May 27, 2016

(65) Prior Publication Data

US 2016/0359409 A1 Dec. 8, 2016

(30) Foreign Application Priority Data

Jun. 5, 2015 (EP) .................................... 15170838

(51) Int. Cl.
*G05F 5/00* (2006.01)
*H02J 1/00* (2006.01)
*H02J 3/12* (2006.01)
*H02M 5/257* (2006.01)
*H02M 3/156* (2006.01)
*H02M 1/36* (2007.01)
*H02M 1/08* (2006.01)

(52) U.S. Cl.
CPC ............ *H02M 3/156* (2013.01); *H02M 1/08* (2013.01); *H02M 1/36* (2013.01)

(58) Field of Classification Search
CPC .......... H02M 3/156; H02M 3/157; G05F 5/00
USPC ................. 323/299, 300, 320–322, 325, 901
See application file for complete search history.

(56) References Cited

U.S. PATENT DOCUMENTS

| 3,733,540 | A | * | 5/1973 | Hawkins | .................. | H02H 7/12 |
| | | | | | | 323/282 |
| 5,371,667 | A | * | 12/1994 | Nakao | ................. | H02M 1/4225 |
| | | | | | | 363/124 |
| 2012/0049823 | A1 | | 3/2012 | Chen | | |

(Continued)

OTHER PUBLICATIONS

European Search Report issued Nov. 24, 2015 in European Application 15170838, filed on Jun. 5, 2015 ( with English Translation).

*Primary Examiner* — Adolf Berhane
*Assistant Examiner* — Gary Nash
(74) *Attorney, Agent, or Firm* — Oblon, McClelland, Maier & Neustadt, L.L.P.

(57) ABSTRACT

A DC-DC converter (1) with low start-up power and voltage includes an inductor (3) connected to an input voltage source (2), a switch (11) connected to the inductor and controlled by a controller (10) and a diode (12) connected to a connection node of the inductor and the switch to provide an output voltage (Vout). The controller includes an oscillator and a monostable element, which are powered by the input voltage (Vin). The oscillator provides an oscillation signal (OSC) having a period T of a switching cycle of the switch. The monostable element (103) is controlled by the oscillation signal to determine a duration Tn of conduction of the switch, during which an increasing current (IL) flows through the inductor. The input impedance of the DC-DC converter increases, when the input voltage (Vin) drops below a first voltage threshold with a decreasing duty cycle d=Tn/T.

22 Claims, 6 Drawing Sheets

(56) References Cited

U.S. PATENT DOCUMENTS

2014/0132236 A1\* 5/2014 Darmawaskita ...... H02M 3/156
                                                          323/283

\* cited by examiner

DC-DC CONVERTER WITH LOW START-UP POWER AND VOLTAGE

This application claims priority from European Patent Application No. 15170838.5 filed Jun. 5, 2015, the entire disclosure of which is incorporated herein by reference.

FIELD OF THE INVENTION

The invention concerns a DC-DC converter with a very low start-up power and voltage, operating in discontinuous mode. The DC-DC converter includes an inductor connected to a power source, which is a voltage source, a switch connected to the inductor and controlled by a controller and a diode element connected to a connection node of the inductor and the switch to provide an output voltage.

The invention also concerns a method for actuation of a DC-DC converter with a very low start-up power and voltage.

BACKGROUND OF THE INVENTION

An inductive Boost DC-DC converter is generally used in a low power electronic circuit to provide an output voltage greater than the input voltage. However, a conversion is not possible if the input voltage is very low unless an input transformer is used, which is expensive and significantly complicates the production of such a DC-DC converter. With any state of the art DC-DC converter, it is therefore not possible to envisage an uncomplicated way of providing a sufficient output voltage to power the electronic components of a circuit based on a very low voltage and power from a voltage source.

For a conventional Boost DC-DC converter, the input voltage must generally be higher than 0.6 V in order to provide a sufficient output voltage. Such a DC-DC converter may include an inductor connected to the drains of a PMOS transistor and of an NMOS transistor, which act as switches. The PMOS and NMOS transistors are connected in series between the converter output terminal and the earth terminal. Inductor L is disposed between a positive terminal of the continuous voltage source, and a connection node of the drain terminals of the two transistors of the converter. The source terminal of the NMOS transistor is connected to an earth terminal, while the source terminal of the PMOS transistor is connected to an output terminal supplying the output voltage.

The PMOS and NMOS transistors are operated alternately by a respective control signal across their respective gate terminal. The NMOS transistor is first of all made conductive to linearly increase a current in the inductor in a first phase, while the PMOS transistor is made conductive in a second phase following the first phase to decrease the current in the inductor towards the converter output, to a zero value, and thus to supply a continuous output voltage.

The conventional DC-DC converter includes components such as current sources or comparators or amplifiers requiring a supply voltage of at least 0.6 V for operation. This type of converter is not able to start and operate with a very low input voltage, which could also be used to directly power the components of the converter, which is a drawback.

The article entitled "Energy Harvesters and Energy Processing Circuits" by Yogesh Ramadass of Texas Instruments in Tutorial T3, 2013 dated 17 Feb. 2013, Institute of Electrical and Electronics Engineers of the University of Pennsylvania ISSCC, may be cited in this regard. This article describes, at pages 61 to 68, a type of ultra-low voltage cold start DC-DC converter. The converter can be powered directly by the input voltage supplied by a continuous voltage source. However, the input impedance is not controlled in the converter to allow start-up at a lower voltage, particularly when the input voltage drops, which is a drawback. Further, it does not provide for a very low power start-up, which is a drawback.

SUMMARY OF THE INVENTION

It is therefore an object of the invention to overcome the drawbacks of the state of the art by providing a DC-DC converter with a low start-up power and voltage, which is capable of adapting its input impedance to prevent an excessive voltage drop at the power source output, when the latter is a very low power source.

To this end, the invention concerns the aforecited DC-DC converter with a low start-up power and voltage, wherein a DC-DC converter with low start-up power and voltage and operating in discontinuous mode, the converter including an inductor for connection to a power source providing an input voltage to be converted, a switch connected to the inductor and controlled by a controller and a diode element connected to a connection node of the inductor and the switch to provide an output voltage, wherein the controller includes at least an oscillator and a monostable element, which are powered by the input voltage provided by the power source, wherein the oscillator is configured to provide an oscillation signal, whose oscillation period determines a period T of one switching cycle of the switch, wherein the monostable element is configured to receive the oscillation signal from the oscillator in order to determine a first duration Tn of conduction of the switch, during which an increasing current flows through the inductor, and wherein, depending on the constituent elements of the oscillator and of the monostable element, a duty cycle $d=Tn/T$ between the first duration of conduction of the switch and the oscillation period of the oscillator decreases, when the input voltage decreases with an increase in the input impedance of the DC-DC converter.

Particular embodiments of the DC-DC converter are defined in the dependent claims 2 to 19.

One advantage of the DC-DC converter of the invention lies in the fact that it can convert a low input voltage, which may be from around 200 mV but at least on the order of 300 mV, into an output voltage, which can be used to power a conventional electronic circuit, of around 1.5 V to 3 V. A single inductor is used avoiding the use of a transformer with two magnetically coupled inductors and with a certain transformation ratio. This can be achieved even if the maximum power that can be delivered by an input voltage source is low. The continuous voltage source connected to the DC-DC converter may be a thermoelectric generator or a single junction photovoltaic cell. The photovoltaic cell can power up an electronic circuit in low lighting conditions.

Advantageously, the DC-DC converter is capable of input impedance matching, and thus auto-power adjustment in order to convert a very low input voltage into an output voltage sufficient to power the electronic components of a circuit. The DC-DC converter thus includes a controller for controlling a MOS transistor. This MOS transistor may be connected in series to a single input inductor, which is directly connected to an electrical power source, which is an input voltage source. The controller is directly powered by the input voltage source. The DC-DC converter also includes a diode element, such as a Schottky diode, which is connected to the connection node between the inductor and the MOS transistor, and supplies the DC-DC converter output voltage. The controller can therefore make the MOS transistor conductive in a first phase of a first duration Tn, and non-conductive after the first duration Tn and until the end of a duration T of a switching cycle. The duty cycle or cyclic ratio d between first duration Tn and cycle duration T decreases, when the input voltage drops to a very low voltage while increasing the input impedance of the DC-DC converter.

Advantageously, the controller is directly powered by the input voltage source. No other polarization current is required with the controller configuration. Since the DC-DC converter is configured with simple elements able to operate at a low voltage, it is not possible to envisage using a conventional MPPT (maximum power point tracking) algorithm.

Advantageously, the controller of the DC-DC converter includes an oscillator, such as a ring oscillator, whose oscillation signal has an oscillation period that determines the duration T of one switching cycle. The controller also includes a monostable element connected to the oscillator, determining a control signal for the transistor to make it conductive for a first duration Tn at each switching cycle. The cycle duration T increases more quickly than first duration Tn when there is an input voltage drop, causing a decrease in the duty cycle d=Tn/T at low input voltages, which is desired with the DC-DC converter of the present invention. The DC-DC converter thus operates at an equilibrium operating point, which is dependent on the output power of the input voltage source, which may be low.

To this end, the invention also concerns a method of actuating a DC-DC converter, wherein a method for actuation of a DC-DC converter, wherein the converter with low start-up power and voltage operates in discontinuous mode and includes an inductor for connection to a power source providing an input voltage to be converted, a switch connected to the inductor and controlled by a controller and a diode element connected to a connection node of the inductor and the switch to provide an output voltage, the method including the steps of:
  controlling the conduction of the switch in a first phase by a control signal from the controller during a first duration Tn, which is determined by the monostable element of the controller to obtain an increasing current in the inductor,
  stopping the conduction of the switch in a second phase during a second duration Tp to induce a decreasing current in the inductor, which is transferred through the diode element to provide an output voltage, and
  once the current in the inductor is zero, a third neutral phase starts with no current entering or leaving the DC-DC converter until the end of a switching cycle period T of the switch,
wherein the duty cycle d=Tn/T between the first duration Tn of conduction of the switch and the oscillation period T of the oscillator decreases when the input voltage decreases in order to obtain an increase in the input impedance of the DC-DC converter.

Specific steps of the method are defined in the dependent claims 21 and 22.

BRIEF DESCRIPTION OF THE DRAWINGS

The objects, advantages and features of the DC-DC converter with low start-up power and voltage and the method for actuation of the DC-DC converter will appear more clearly in the following description made with reference to at least one non-limiting embodiment, illustrated by the drawings, in which.

DETAILED DESCRIPTION OF THE INVENTION

In the following description, all those elements of the DC-DC converter that are well known to those skilled in the art in this technical field will be described only in a simplified manner. The DC-DC converter is arranged to convert a very low input voltage into an output voltage sufficient to power the electronic components of a circuit.

Figure 1:
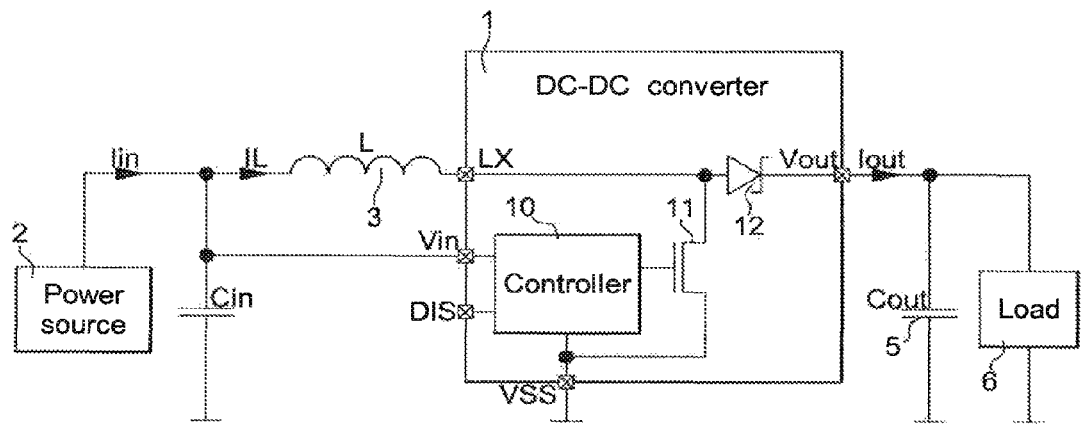
FIG. 1 shows a circuit with a Boost DC-DC converter according to the invention.

FIG. 1 shows a schematic view of a DC-DC Boost converter 1, i.e. a voltage boost converter with a higher output voltage level Vout than the continuous input voltage level Vin. This DC-DC converter can start or operate at a very low input voltage and very low power in discontinuous mode. Input impedance matching is effected as a function of the DC-DC converter output voltage, as explained below. The impedance increases when the input voltage decreases.

The DC-DC converter first includes an inductor L 3, which is not represented in the main converter block given that inductor 3 is not integrated with the other electronic components of the converter. The single inductor L used is connected on one side to a power source 2, which is a continuous voltage source, and on another side to a switch 11, which is preferably a MOS transistor 11 in the main converter block. MOS transistor 11 is preferably an NMOS transistor, whose source is connected to the earth terminal VSS and whose drain is connected to inductor L by an inductor terminal LX of the main DC-DC converter block 1.

DC-DC converter 1 also includes a controller 10 for controlling NMOS transistor 11 through its gate, and a diode element 12, which may preferably be a Schottky diode. This diode element 12 is connected to the connection node between inductor 3 and NMOS transistor 11 to provide an output voltage through an output terminal Vout. Diode 12 is of course disposed to provide a positive current Iout, i.e. in the direction of output Vout to a load 6 in parallel to a storage capacitor 5 Cout. Diode 12 prevents a current from re-entering the DC-DC converter from output Vout, and avoids discharging storage capacitor 5 Cout. Capacitor Cout of converter 1 is also placed outside the main converter block given that it is not integrated with the other electronic components of said main block, which may also be the case for Schottky diode 12.

To increase the input impedance of DC-DC converter 1, when input voltage Vin decreases, there is a controlled switch-on duration Tn of NMOS transistor 11 relative to a switching cycle duration T of the NMOS transistor, as explained below with reference to FIGS. 4 to 10. This defines a mean current Iin drawn by the DC-DC converter. When input voltage Vin decreases, the duty cycle d=Tn/T decreases at least within a low input voltage range Vin, notably beyond a first voltage threshold. With the decrease in duty cycle d, there is obtained an increase in input impedance, which is sought by the present invention. Thus, the mean current Iin drawn by converter 1 is adapted to the current that power source 2 can deliver.

It should also be noted that DC-DC converter 1 includes an input capacitor Cin of large dimensions for example on the order of 10 µF connected to the output of voltage source 2, which is also connected to an input terminal Vin of the main DC-DC converter block 1. This input converter Cin can filter current variations during the switching of NMOS transistor 11 for the flow of current IL through inductor 3. This maintains a relatively constant input voltage Vin and a defined mean input current Iin. Thus, controller 10 is directly powered by the input voltage Vin supplied by voltage source 2. The components comprised in controller 10 are capable of operating at a very low voltage, for example from 200 mV, but preferably at least at 300 mV, and also at a very low power, for example less than 1 µWatt, given that the entire circuit with the output load can start with 3 µWatt.

Figure 4:
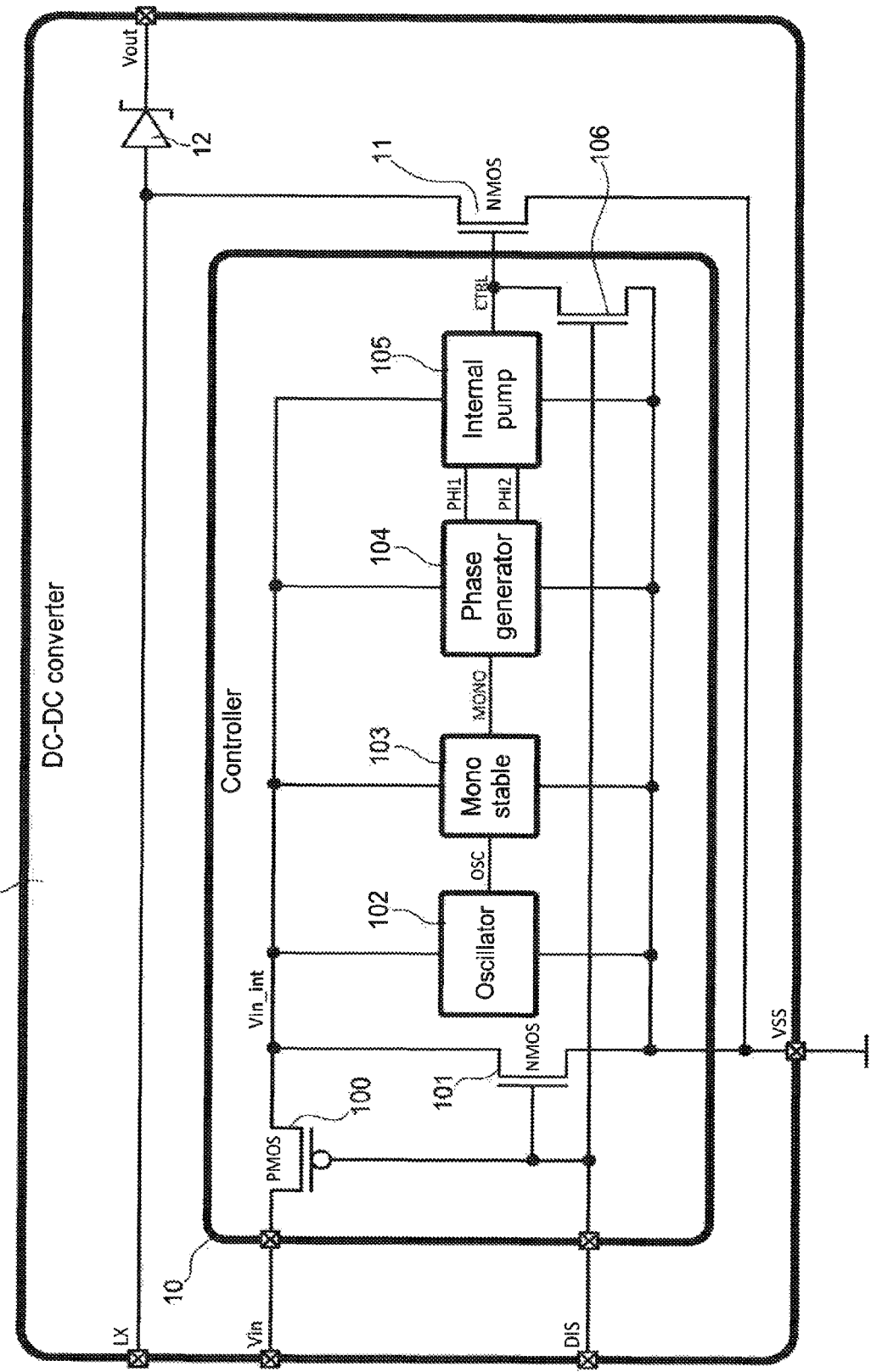
FIG. 4 shows an embodiment of the DC-DC converter with the controller components for input impedance matching as a function of input voltage according to the invention.

The components of the main DC-DC converter block 1 are advantageously made in an integrated circuit in 0.18 µm (ALP) CMOS technology. The various elements of controller 10, explained in detail below with reference to FIG. 4, are formed of PMOS, NMOS transistors, resistors and capacitors obtained in this technology and with transistor dimensions adapted to increase the input impedance of the converter when the input voltage drops.

Figure 2:
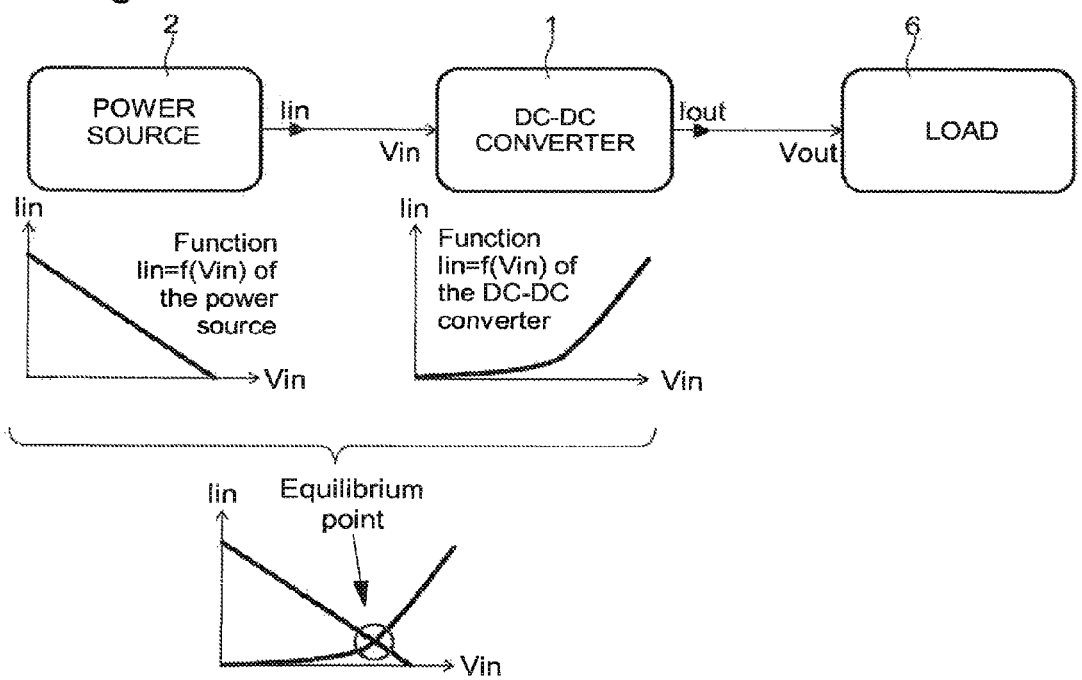
FIG. 2 shows an operating diagram of the DC-DC converter connected to a power source to supply an output voltage for a load according to the invention with curves plotted as a function of the mean input current relative to the output voltage and the equilibrium point.

FIG. 2 shows an operating diagram of DC-DC converter 1 connected at input to a power source 2 to provide an output voltage Vout with an output current Iout for a load 6 according to the invention. A mean current Iin is outputted from power source 2, which is preferably a voltage source, with an input voltage of the DC-DC converter at Vin. The power source may be a thermoelectric generator or a single junction photovoltaic cell.

For a power source 2, such as a thermoelectric generator, model operation can be created with an internal voltage source connected to an internal resistor (not shown), through which the power source output voltage Vin decreases with the increase in output current Iin. The power source may provide a load voltage of around 0.35 V with an internal resistance of around 2 kOhms for example. In that case, the first curve of the function Iin=f(Vin) is shown to illustrate the variation in current Iin relative to power source voltage Vin.

Figure 3:
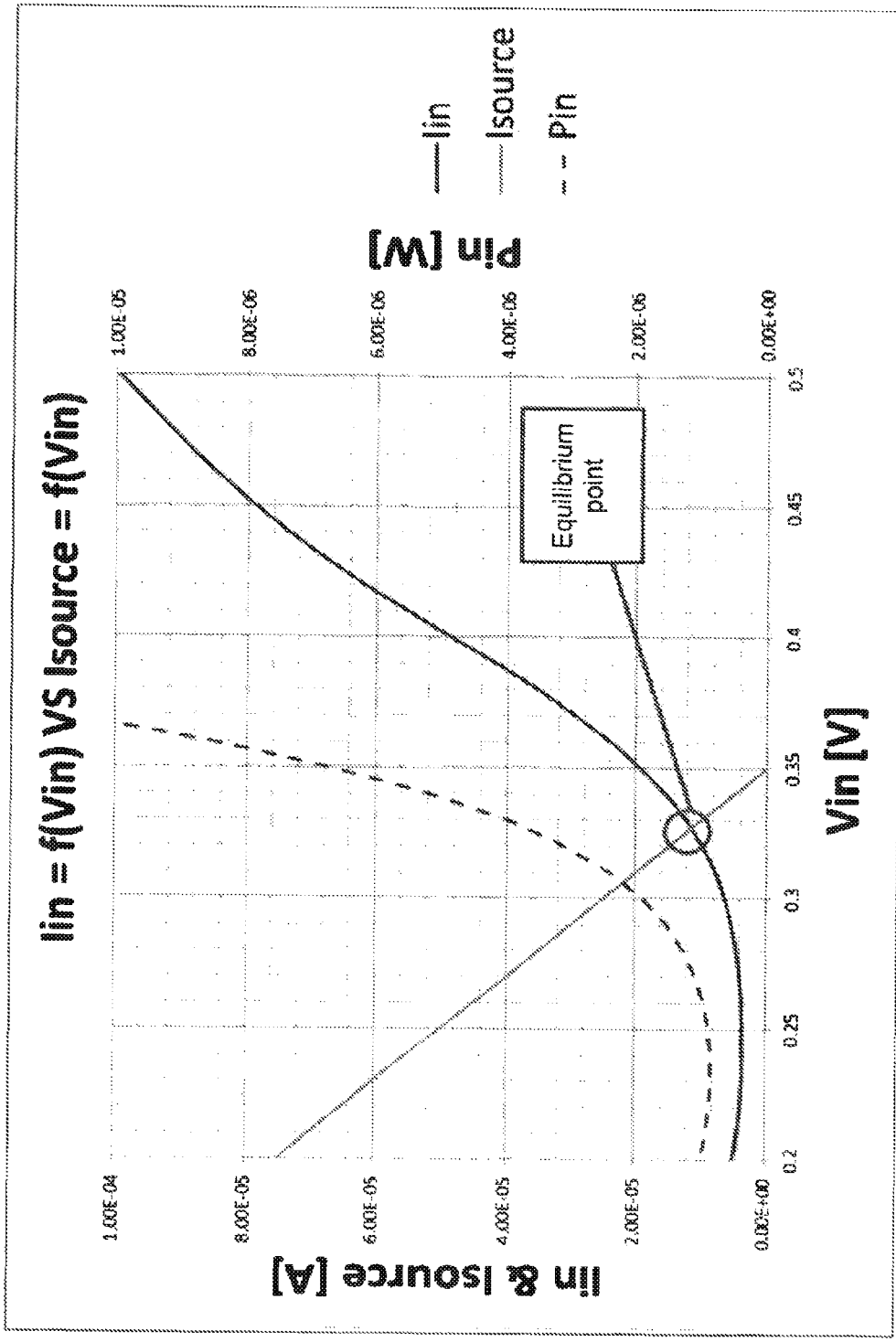
FIG. 3 shows curves illustrating the point of equilibrium between the curve showing the mean current from the power source relative to its output voltage and the curve showing the relation between the mean input current and the output voltage of the DC-DC converter, and the input power.

Conversely, the second curve of the function Iin=f(Vin) relating the operation in DC-DC converter 1, shows that mean input current Iin decreases in a non-linear manner when input voltage Vin decreases. A sharp decrease in current Iin occurs with a decrease in input voltage Vin below a threshold value, which is a first voltage threshold Vth1. This sharp decrease in current Iin occurs at least up to input voltage Vin at the equilibrium point and in proximity to a second threshold voltage Vth2 as shown in FIG. 3. A smaller decrease in current Iin occurs with a decrease in input voltage Vin above the first low voltage threshold Vth1 and also below the equilibrium point. This means that the input impedance of DC-DC converter 1 increases when there is a drop in input voltage Vin towards the equilibrium point as expected by the present invention. The DC-DC converter will thus automatically decrease the required mean input current Iin, when input supply voltage Vin decreases.

As demonstrated by the combination of the two curves on the last graph of FIG. 2, the assembly formed of power source 2 and DC-DC converter 1 will stabilise at an equilibrium operation point at the intersection of these two curves. This depends on the power source output power, which may be low for operation of the DC-DC converter.

As illustrated in more detail in FIG. 3, the two function curves Iin=f(Vin) of the power source and of the DC-DC converter are shown. As the DC-DC converter is arranged to operate at a very low voltage and power, it is noted that the equilibrium point at the intersection of the two curves is located for example at an input voltage value Vin of around 0.33 V with a mean input current of around 10 µA. This also gives an input power of around 3 µWatt. The input power may thus be very low for operation of the DC-DC converter, which is anticipated by the present invention.

Of course, the numerical values indicated above are provided simply by way of example for the DC-DC converter 1 of the present invention. An equilibrium point at a higher or lower input value Vin with a higher or lower mean current Iin may be envisaged without limiting the scope of the present invention.

Figure 9:
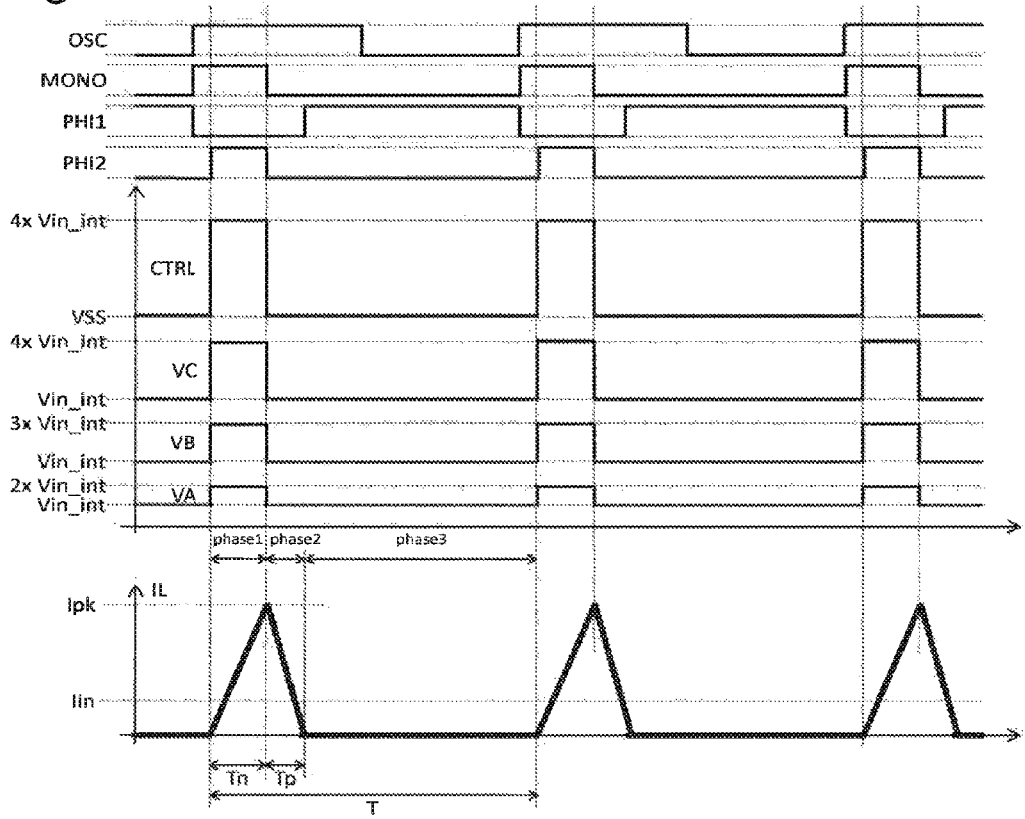
FIG. 9 shows graphs of the signals in the various components of the DC-DC converter controller according to the invention, and a graph of the current through the inductor over one duration of each switching cycle.

Referring in particular to FIGS. 1 and 9, there is now described the operation in discontinuous mode of the DC-DC converter 1 of the present invention. In a first phase of a first duration or first time Tn, switch 11, i.e. the NMOS transistor, is made conductive by controller 10. This induces a current through inductor 3 of the DC-DC converter. The current, from power source 2, will increase in the inductor throughout first duration Tn to a peak value defined as Ipk. In an ideal case, the current increases linearly during first duration Tn. At the end of this first duration Tn, the NMOS transistor is controlled by controller 10 to become non-conductive until the end of a switching cycle of duration T.

In a second phase following the first phase with NMOS transistor 11 made non-conductive, the current induced in inductor 3 is transferred as output current Iout in load 6 and storage capacitor 5 Cout via diode element 12, which is preferably a Schottky diode. In this second phase of second duration or second time Tp, the current in the inductor decreases as it flows through Schottky diode 12 in order to obtain output voltage Vout. At the end of this second duration Tp, the current through the inductor becomes zero. Output voltage Vout increases until a stabilised output voltage which is obtained after several switching cycles. This output voltage Vout is thus higher than input voltage Vin.

Once the current in inductor 3 is zero, the third phase starts. This third phase can be considered neutral, with no current entering or leaving the DC-DC converter. Schottky diode 12 prevents load 6 and storage capacitor 5 from discharging towards the DC-DC converter input in power source 2. The duration of the three phases thus defines the switching cycle period or duration T. Several successive switching cycles are thus repeated indefinitely to obtain a stabilised output voltage Vout. However, once output voltage Vout is stabilised and sufficient to power a circuit connected to the DC-DC converter, an external unit can stop said DC-DC converter by actuating the input DIS of DC-DC converter 1. It is therefore possible to envisage using another more efficient DC-DC converter which permits execution of a MPPT algorithm once actuated.

The ratio between switching cycle period T and first duration Tn is essential to influence mean current Iin, which will be transferred from power source 2 to load 6 at the output of DC-DC converter 1. This ratio is called the duty cycle d=Tn/T. Mean input current Iin is mainly the current that flows in inductor 3, but it also concerns to a small extent part of the operating current of controller 10. Mean current Iin is mainly defined by the surface under the triangular curve of current IL through inductor 3, as shown in FIG. 9, during the first and second durations Tn and Tp, divided by the total period T of one switching cycle.

As such, a first equation can be defined as:

$$Iin = Ipk \cdot (Tn+Tp)/(2 \cdot T)$$

The peak current Ipk, which is induced in inductor 3 during the first phase of first duration Tn, is dependent on the intrinsic value of inductor L, on time Tn and on input voltage Vin as set out below in a second equation:

$$Ipk = Vin \cdot Tn/L$$

Second duration Tp depends on peak current Ipk, on the value of inductor L and on the difference between output voltage Vout and input voltage Vin also taking account of the drop in voltage Vd through Schottky diode 12. A third equation can be defined as follows:

$$Tp = Ipk \cdot L/(Vout - Vd - Vin)$$

Inserting the second equation into the third equation yields the following fourth equation:

$$Tp = Vin \cdot Tn/(Vout - Vd - Vin)$$

Inserting the second and fourth equations into the first equation yields the following fifth equation:

$$Iin = (Vin \cdot Tn^2/(2 \cdot L \cdot T)) \cdot (1 + (Vin/(Vout - Vd - Vin)))$$

Since duty cycle d is equal to Tn/T, finally the following sixth equation is obtained:

$$Iin = (Vin \cdot d \cdot Tn/(2 \cdot L)) \cdot (1 + (Vin/(Vout - Vd - Vin)))$$

Mean current Iin is the current drawn by DC-DC convert 1 from power source 2. It therefore depends on input voltage Vin, duty cycle d, which depends on the controller components explained in more detail below with reference to FIGS. 4 to 6, on first duration Tn, on value L of inductor 3, on output voltage Vout and on the drop in voltage Vd through Schottky diode 12. It is therefore seen that first duration Tn, and duty cycle d are important for adapting mean current Iin to the current that power source 2 can deliver and thus allowing the DC-DC converter to operate at a very low voltage and power.

As a result of controller 10 and as shown in FIG. 3, the current Iin that DC-DC converter 1 draws from power source 2 falls sharply when the voltage delivered by power source 2 drops, at least in an area of low input voltage Vin and at a defined first voltage threshold Vth1. This makes it possible to obtain a power source 2 that does not collapse completely but still delivers power for conversion. According to the invention, the DC-DC converter is configured to perform input impedance matching. The input impedance increases when the input voltage drops or decreases notably beyond the first voltage threshold. Duty cycle d also decreases from this first voltage threshold.

FIG. 4 shows an embodiment of controller 10 in DC-DC converter 1. Controller 10 mainly includes oscillator 102, a monostable element 103, a phase generator 104 and an internal charge pump 105, which, via control signal CTRL, controls NMOS transistor 11. All these components are directly powered by internal input voltage Vin_int, which is directly the input voltage Vin from the power source, when input switch 100, which is preferably a PMOS transistor, is made conductive. Input DIS, which is connected to the gate of PMOS transistor 100, must thus be controlled by an external unit to be at earth VSS to make PMOS transistor 100 conductive for the proper operation of controller 10.

In order to stop controller 10, input DIS must be set at input voltage Vin or an even higher voltage than Vin, to make PMOS transistor 100 non-conductive in a pause mode. Further, a first NMOS transistor 101, which is connected between the internal input voltage line Vin_int and earth VSS, and a second NMOS transistor 106, which is connected between the gate of NMOS transistor 11 and earth VSS, are made conductive. To achieve this, the gates of NMOS transistors 101 and 106 are connected to input DIS, which is connected to input voltage Vin or an even higher voltage than Vin.

Oscillator 102 of the controller defines the switching cycle period T of NMOS transistor 11, while monostable element 103 defines the first duration Tn during which NMOS transistor 11 is made conductive. This defines the duty cycle d=Tn/T and determines the mean current Iin drawn by the DC-DC converter. Oscillator 102 thus provides an oscillation signal OSC of period T to monostable element 103 to enable the latter to determine first duration Tn. Monostable element 103 controls, via a control signal MONO, the phase generator 104, which provides, in a conventional manner, two phase signals PHI1 and PHI2 to control the internal charge pump 105. Based on two non-overlapping phase signals PHI1 and PHI2, charge pump 105 multiplies the peak voltage of control signal CTRL of the gate of NMOS transistor 11 to ensure the proper conductivity of NMOS transistor 11 during first period Tn. FIG. 9 precisely represents the various signals in the DC-DC converter and also the various voltage levels VA, VB, VC of internal charge pump 105.

Figure 5:
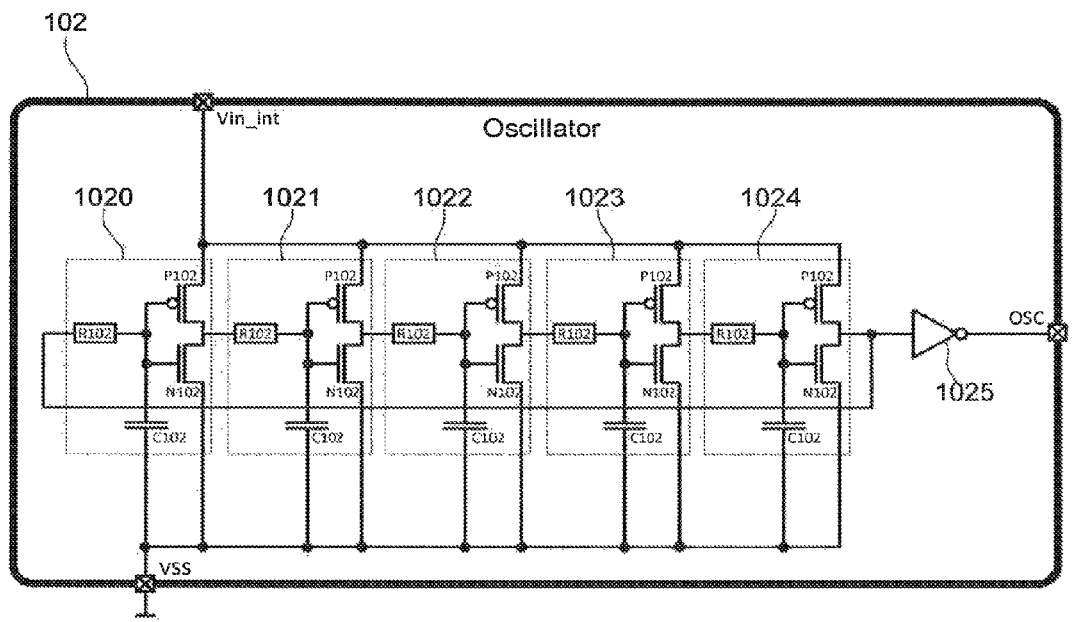
FIG. 5 shows an embodiment of an oscillator of the DC-DC converter controller according to the invention.

FIG. 5 shows an embodiment of the controller oscillator 102. This oscillator is preferably a ring oscillator, which is based on the switching time of one or more inverters. To achieve this, the ring oscillator includes an odd number N of successive inverter stages 1020 to 1024. Each stage is generally formed of an RC network with the resistor R102 and capacitor C102 connected to a corresponding inverter. It is therefore possible to obtain an oscillation signal OSC at the oscillator output of switching cycle period T. The switching duration of each inverter connected to the RC network is of course dependent on the technological integration parameters of the DC-DC converter.

As indicated above, oscillator 102 therefore includes N inverter stages 1020, 1021, 1022, 1023 and 1024, successively connected to each other, with the output of the last inverter stage 1024 connected to the input of the first inverter stage 1020 to close the loop. The number N of inverter stages must of course be an odd integer number for operation of the ring oscillator. This number N may be equal to 5, but may also have another value according to the desired oscillation period. Oscillation signal OSC of period T is provided to the output of an output inverter 1025 connected to the output of the last inverter stage 1024. All of inverters 1020 to 1025 are directly powered by internal input voltage Vin_int, which corresponds to input voltage Vin during operation of the DC-DC converter.

Each inverter of stages 1020 to 1024 of oscillator 102 is formed conventionally of a PMOS transistor P102 mounted in series with an NMOS transistor N102 between the internal input voltage terminal Vin_int and earth terminal VSS. A resistor R102 connects the output of a preceding inverter and the gates of transistors P102 and N102. Each inverter output is the connection node of the drains of transistors P102 and N102. A capacitor C102 is also connected between the connected gates of transistors P102 and N102 and earth terminal VSS to define the RC network with resistor R102.

Figure 10:
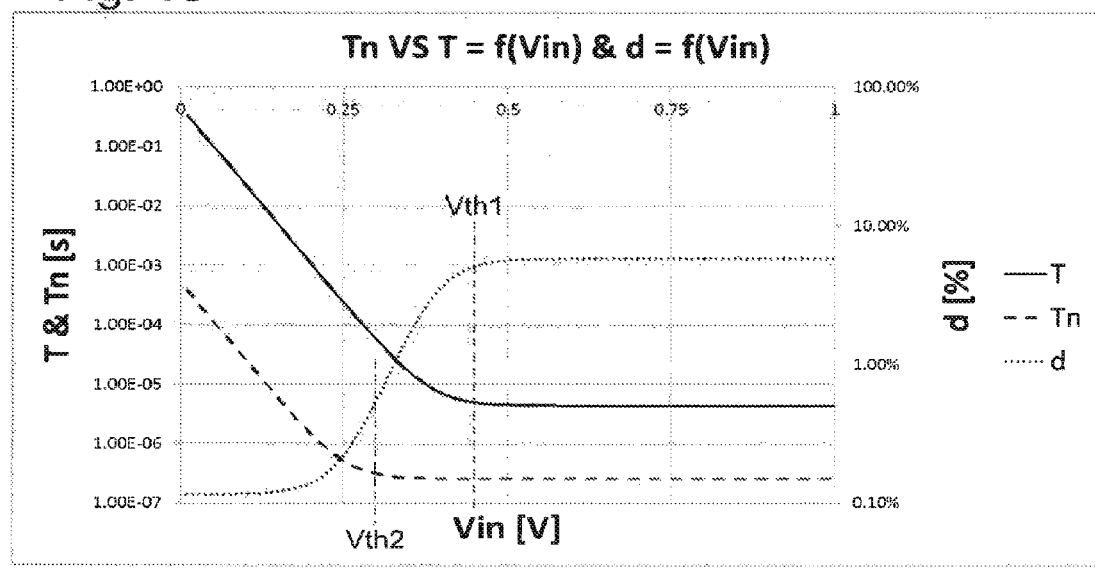
FIG. 10 shows curves representing the variation in first duration Tn, in switching cycle duration T and in duty cycle d relative to the input voltage of the DC-DC converter according to the invention.

Every inverter 1020 to 1024 with their RC network, which is formed of resistor R102 and capacitor C102, thus generates a delay and the sum of the delays determines the oscillation period T of oscillation signal OSC. When internal input voltage Vin_int is high, the resistivity of the PMOS P102 and NMOS N102 transistors is negligible with respect to resistor R102 of the RC network with capacitor C102. Thus oscillation T does not depend on the resistivity of transistors P102 and N102. However, when the internal input voltage decreases, the resistivity of PMOS and NMOS transistors P102 and N102 increases and becomes preponderant with respect to resistor R102, particularly in an area of low input voltage, for example beyond a first voltage threshold Vth1, which may be around 0.45 V, as shown in FIG. 10. Oscillation period T will thus increase at low voltage.

Figure 6:
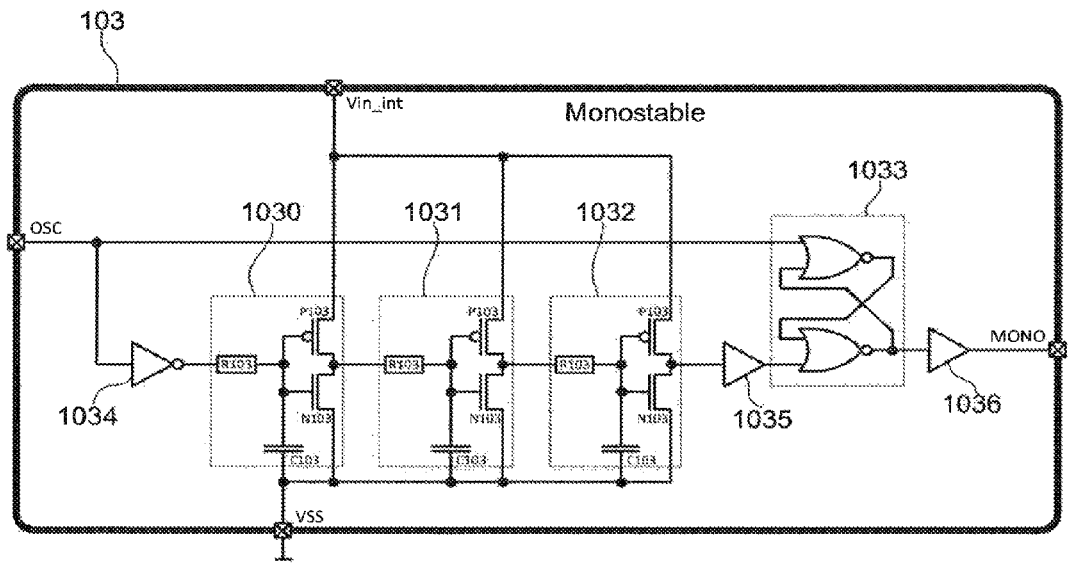
FIG. 6 shows an embodiment of a monostable element of the DC-DC converter controller according to the invention.

FIG. 6 shows an embodiment of monostable element 103, which is controlled by oscillation signal OSC of the oscillator. The monostable element mainly includes a certain number M of delay stages 1030, 1031,1032 connected one after the other for determination of the first duration of actuation Tn of NMOS transistor 11 of the converter shown in FIG. 4. The number M of delay stages is an integer number greater than or equal to 1. This number M may be equal to 3, but of course a higher or lower number of stages may be provided, depending on the desired duration of actuation Tn of NMOS transistor 11 shown in FIG. 4.

Each delay stage includes an inverter, which is formed conventionally of a PMOS transistor P103 mounted in series with an NMOS transistor N103 between the internal input voltage terminal Vin_int and the earth terminal VSS, and an input RC network. For the RC network, a resistor R103 is placed between the input of each stage and the connected gates of transistors P103 and N103. Each inverter output is the connection node of the drains of transistors P103 and N103. A capacitor C103 is also connected between the connected gates of transistors P103 and N103 and the earth terminal VSS and defines the RC network with resistor R103.

The first delay stage 1030 receives oscillation signal OSC from the oscillator through an input inverter 1034. Oscillation signal OSC is also provided directly to a first input of an RS flip-flop 1033, while a second input of the RS flip-flop is connected to the output of the last delay stage 1032 via an intermediate non-inverter 1035. The RS flip-flop is formed, for example, of two NOR logic gates. The output of RS flip-flop 1033 provides the control signal MONO via a non-inverting output 1036.

As also shown in FIG. 9, at a rising edge of oscillation signal OSC, RS flip-flop 1033 of monostable element 103 forces control signal MONO to a logic level "1". At the same time, oscillation signal OSC propagates through delay stages 1030 to 1032, which are RC network inverters. The sum of the delays of inverters 1030 to 1032, and any delay relating to the phase generator and to the charge pump, which follow, define the first period of actuation Tn of NMOS transistor 11, shown in FIG. 4. Following the command from the last delay stage 1032 to the second input of RS flip-flop 1033, control signal MONO changes at the end of first duration Tn to a logic level "0" until the end of the period T of one switching cycle, which is defined by the period T of oscillation signal OSC.

As explained above with reference to the oscillator, when internal input voltage Vin_int is high, the resistivity of the PMOS and NMOS transistors P102 and N102 is negligible with respect to resistor R103 of the RC network. Thus, the delay of each delay stage 1030, 1031 and 1032 does not depend on the resistivity of transistors P103 and N103. However, when the internal input voltage decreases, the resistivity of the PMOS and NMOS transistors P103, N103 increases and becomes preponderant with respect to resistor R103, especially in a low input voltage area, for example, beyond a second voltage threshold Vth2, which may be around 0.3 V as also shown in FIG. 10. The first duration Tn will therefore increase at low voltage, particularly below 0.3 V.

It should also be noted that the duty cycle d=Tn/T decreases sharply at least beyond the first voltage threshold Vth1 and to below the second voltage threshold Vth2, as shown in FIG. 10.

Figure 7:
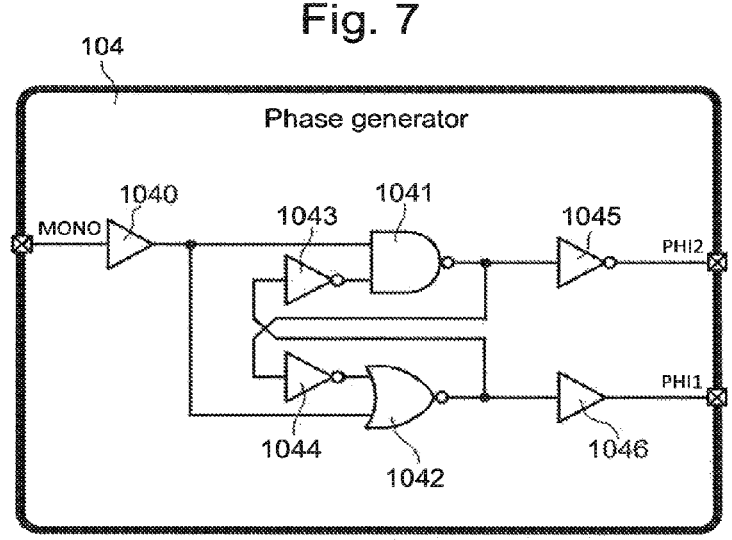
FIG. 7 shows an embodiment of a phase generator of the DC-DC converter controller according to the invention.

FIG. 7 shows an embodiment of a phase generator 104, which is controlled by control signal MONO from the monostable element. The components of this well known generator are also directly powered by internal input voltage Vin_int.

Generator 104 includes first of all a non-inverter at input 1040, which receives control signal MONO from the monostable element. The non-inverter output 1040 is connected on one hand to a first input of a NAND gate 1041, and on the other to a first input of a NOR gate 1042. The output of the NAND gate 1041 is connected via an inverter 1044 to a second input of NOR gate 1042. The output of the NOR gate 1042 is connected via an inverter 1043 to a second input of NAND gate 1041. The output of the NOR gate 1042 provides a signal through a non-inverter of output 1046, which provides the first phase signal PHI1. Finally, the output of the NAND gate provides a signal through an inverter of output 1045, which provides the second phase signal PHI2.

As shown in FIG. 9, the first phase signal PHI1 changes from a logic state "1" to a logic state "0" at the rising edge of oscillation signal OSC of the oscillator, when control signal MONO changes to a logic state "1". This logic state "0" of first phase signal PHI1 finishes at the end of second duration Tp at the end of the second phase. Second phase signal PHI2 changes from a logic state "0" to a logic state "1" at the start of conduction of NMOS transistor 11 of FIG. 4 and throughout the entire duration of actuation Tn of said NMOS transistor 11.

Figure 8:
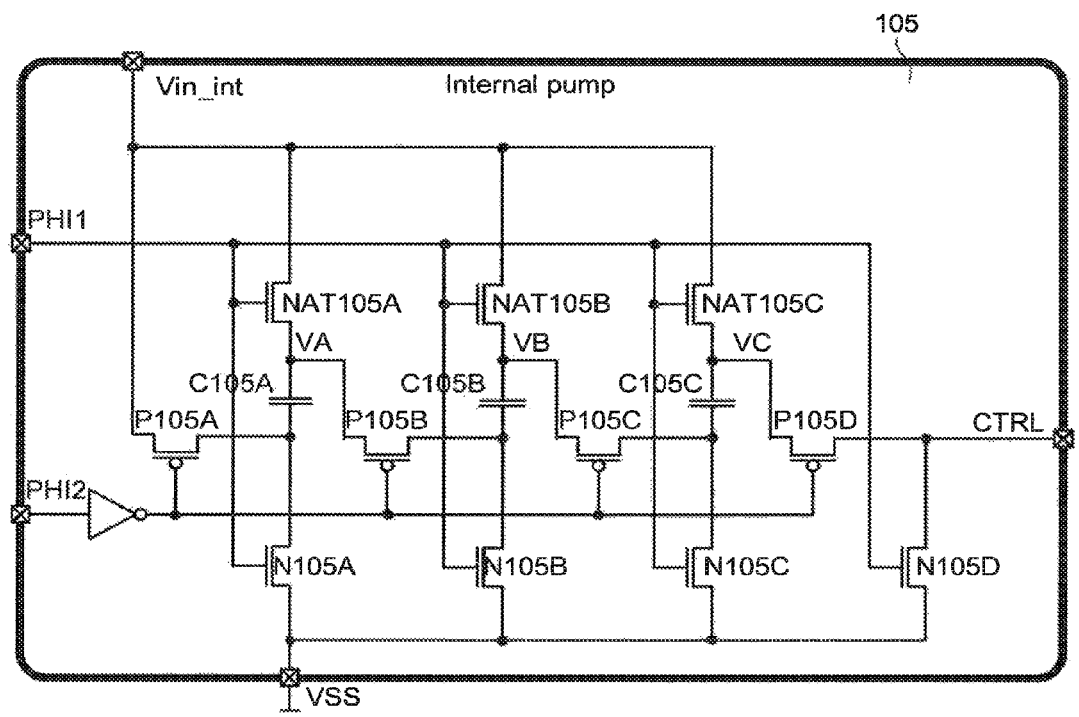
FIG. 8 shows an embodiment of an internal charge pump of the DC-DC converter controller according to the invention.

FIG. 8 shows the internal charge pump 105, which is controlled by the two phase signals PHI1 and PHI2 from the phase generator. Three input voltage Vin_int referred Boost stages are arranged before the supply of earth VSS referred control signal CTRL to control the NMOS transistor 11 of FIG. 4. Each stage includes two NMOS transistors, which are mounted in series with a capacitor and a PMOS transistor. Signals VA, VB, VC, CTRL of this charge pump are represented in FIG. 9.

The first Boost stage includes a first PMOS transistor P105A, whose source is connected to internal input voltage Vin_int. The gate of transistor P105A receives the second phase signal PHI2 through an input inverter. The drain of transistor P105A is connected to a first electrode of a first capacitor C105A and to the drain of a first NMOS transistor N105A, whose source is directly connected to the earth terminal VSS. The second electrode of capacitor C105A is connected to the source of a second NMOS transistor NAT105A, whose drain is directly connected to the internal input voltage Vin_int. This NMOS transistor NAT105A is called "native" since its switching threshold is at 0 V. It is conductive when the voltage between its gate and its source is greater than or equal to 0 V. A negative gate-source voltage must be applied to make it non-conductive. The gates of transistors N105A and NAT105A are controlled by the first phase signal PHI1. The connection node between the first capacitor C105A and the second transistor NAT105A provides a voltage VA, which may be of a value approximately equal to two times the internal input voltage during first duration Tn, which corresponds to the second phase signal PHI2 at logic state "1".

The second Boost stage includes a first PMOS transistor P105B, whose source is connected to output voltage VA of the first Boost stage. The gate of transistor P105B receives the second phase signal PHI2 through the input inverter. The drain of transistor P105B is connected to a first electrode of a second capacitor C105B and to the drain of a first NMOS transistor N105B, whose source is directly connected to the earth terminal VSS. The second electrode of capacitor C105B is connected to the source of a second native NMOS transistor NAT105B, whose drain is directly connected to the internal input voltage Vin_int. The gates of transistors N105B and NAT105B are controlled by the first phase signal PHI1. The connection node between the second capacitor C105B and the second native transistor NAT105B provides a voltage VB, which may be of a value approximately equal to three times the internal input voltage during first duration Tn, which corresponds to the second phase signal PHI2 at logic state "1".

The third Boost stage includes a first PMOS transistor P105C, whose source is connected to output voltage VB of the second boost stage. The gate of transistor P105C receives the second phase signal PHI2 through the input inverter. The drain of transistor P105C is connected to a first electrode of a third capacitor C105C and to the drain of a first NMOS transistor N105C, whose source is directly connected to the earth terminal VSS. The second electrode of capacitor C105C is connected to the source of a second native NMOS transistor NAT105C, whose drain is directly connected to the internal input voltage Vin_int. The gates of transistors N105C and NAT105C are controlled by the first phase signal PHI1. The connection node between the third capacitor C105C and the second native transistor NAT105C provides a voltage VC, which may be of a value approximately equal to four times the internal input voltage during first duration Tn, which corresponds to the second phase signal PHI2 at logic state "1".

Finally, for the supply of control signal CTRL, there is provided a PMOS transistor P105D, whose source is connected to the connection node between third capacitor C105C and second native transistor NAT105C of the third Boost stage. The drain of this PMOS transistor P105D is connected to the drain of an NMOS transistor 105D, whose source is directly connected to earth terminal VSS. The gate of transistor P105D receives the second phase signal PHI2 through the input inverter, while the gate of transistor N105D receives first phase signal PHI1. The connection node between transistors P105D and N105D supplies control signal CTRL to control the conduction of NMOS transistor 11 of the converter in FIG. 4 with a voltage of a value approximately four times input voltage Vin. Control signal CTRL is thus at logic state "1" throughout first duration Tn.

FIG. 10 also shows curves which represent the variation in first duration Tn, in switching cycle duration T and in duty cycle d relative to the input voltage Vin of the DC-DC converter according to the invention. It is noted in this Figure that period T increases for input voltages Vin below a first voltage threshold Vth1, and that first duration Tn increases for input voltages Vin below a second voltage threshold Vth2 lower than first threshold Vth1. Consequently, the duty cycle d decreases sharply beyond the first voltage threshold Vth1 before stabilising at a low value below the second voltage threshold Vth2. This also means that with a decrease in duty cycle d, there is an increase in the input impedance of the DC-DC converter, which is desired in order to operate also at low power.

The first threshold Vth1 may be, for example, around 0.45 V, while the second threshold Vth2 may be, for example, around 0.3 V. The duty cycle d will thus decrease sharply, when input voltage Vin tends towards a very low voltage.

In order to determine the first duration Tn and switching period T, the NMOS transistors N103 of the monostable element in FIG. 6 must be wider than the NMOS transistors N102 of the oscillator in FIG. 5. Likewise, the PMOS transistors P103 of monostable element 103 must be wider than the PMOS transistors P102 of the oscillator. Thus, the following parameters may be proposed by way of non-limiting example:

NMOS N102 of oscillator 102: W/L=2 μm/1 μm
PMOS P102 of oscillator 102: W/L=2 μm/1 μm
Resistors R102 of oscillator 102: R=100 kOhms
Capacitors C102 of oscillator 102: C=6.1 pF
NMOS N103 of monostable element 103: W/L=50 μm/0.25 μm
PMOS P103 of monostable element 103: W/L=50 μm/0.25 μm
Resistors R103 of monostable element 103: R=100 kOhms
Capacitors C103 of monostable element 103: C=1 pF
where W defines the gate width, and L defines the gate length. These parameters are defined with 0.18 μm (ALP) CMOS integrated circuit technology From the description that has just been given, several variants of the discontinuous conduction mode DC-DC converter can be devised by those skilled in the art without departing from the scope of the invention defined by the claims. A single output diode could be provided instead of a Schottky diode, but the voltage drop is greater. It is possible to increase the number of inverters in the oscillator and/or the number of delay stages in the monostable element to increase or decrease the duty cycle.

What is claimed is:
1. A DC-DC converter with low start-up power and voltage and operating in discontinuous mode, the converter including an inductor for connection to a power source providing an input voltage to be converted, a switch connected to the inductor and controlled by a controller and a diode element connected to a connection node of the inductor and the switch to provide an output voltage, wherein the controller includes at least an oscillator and a monostable element, which are powered by the input voltage provided by the power source, wherein the oscillator is configured to provide an oscillation signal, whose oscillation period determines a period T of one switching cycle of the switch, wherein the monostable element is configured to receive the oscillation signal from the oscillator in order to determine a first duration Tn of conduction of the switch, during which an increasing current flows through the inductor, and wherein, depending on the constituent elements of the oscillator and of the monostable element, a duty cycle d=Tn/T between the first duration of conduction of the switch and the oscillation period of the oscillator decreases, when the input voltage decreases with an increase in the input impedance of the DC-DC converter.

2. The DC-DC converter according to claim 1, wherein the oscillator is a ring oscillator, which includes a number N of successive inverter stages, where N is an integer odd number greater than 1, the last inverter stage being connected in a loop to the first inverter stage.

3. The DC-DC converter according to claim 2, wherein the number N of inverter stages is equal to 5, and wherein an output inverter is connected to the last inverter stage to provide the oscillation signal.

4. The DC-DC converter according to claim 2, wherein each inverter stage includes an RC network, which is formed of a resistor and a capacitor connected to a corresponding inverter.

5. The DC-DC converter according to claim 4, wherein each inverter includes a PMOS transistor mounted in series with an NMOS transistor between an internal input voltage terminal of the oscillator and an earth terminal, wherein the resistor is connected on one hand to gates of the two PMOS and NMOS transistors of the same stage, and on the other hand to drains of the PMOS and NMOS transistors of a preceding stage, and wherein the capacitor is connected between the gates of the PMOS and NMOS transistors and the earth terminal.

6. The DC-DC converter according to claim 1, wherein the monostable element includes a number M of successive delay stages, wherein M is an integer number greater than or equal to 1, for the determination of the first duration Tn of actuation of the switch.

7. The DC-DC converter according to claim 6, wherein the number M of delay stages is equal to 3.

8. The DC-DC converter according to claim 6, wherein each delay stage includes an inverter, which is formed of a PMOS transistor mounted in series with an NMOS transistor between an internal input voltage terminal of the monostable element and an earth terminal and an RC input network, and wherein the RC network includes a resistor between an input of each stage and connected gates of the PMOS and NMOS transistors, and a capacitor connected to the gates of the PMOS and NMOS transistors and to the earth terminal, and wherein an output of each stage is a connection node of the drains of the PMOS and NMOS transistors.

9. The DC-DC converter according to claim 6, wherein each delay stage further includes an RS flip-flop receiving, at a first input, the oscillation signal from the oscillator and, at a second input, an output signal from the last delay stage in order to provide, at output, a control signal for the determination of the first duration Tn.

10. The DC-DC converter according to claim 9, wherein the first delay stage receives the oscillation signal from the oscillator via an input inverter, wherein the second input of the RS flip-flop receives an output signal from the last delay stage via an intermediate non-inverter, and wherein the control signal is provided at the monostable element output from the RS flip-flop output via a non-inverter of output.

11. The DC-DC converter according to claim 1, wherein the switch is a MOS transistor, such as an NMOS transistor, connected between the inductor and an earth terminal, whose gate receives a control signal from the controller for control of the first duration Tn of conduction of the MOS transistor, and wherein the diode element is a Schottky diode connected between a connection node of the inductor and of the MOS transistor and an output terminal of the DC-DC converter.

12. The DC-DC converter according to claim 1, wherein the controller includes a phase generator controlled by a control signal from the monostable element, and an internal charge pump, which is clocked by two phase signals from the phase generator, and controls, via a control signal, the switch, which is a MOS transistor.

13. The DC-DC converter according to claim 12, wherein the controller includes an input switch, which is a PMOS transistor, whose source is connected to an input voltage terminal of the converter to receive the input voltage from the power source, and a drain for providing the internal input voltage for the oscillator, the monostable element, the phase generator and the internal charge pump, wherein a gate of the PMOS transistor is controlled by an input signal from an external unit from an input terminal of the controller, in order to make the PMOS transistor conductive for the operation of the controller, or non-conductive in a pause mode of the controller.

14. The DC-DC converter according to claim 13, wherein the controller also includes a first NMOS transistor, which is connected between the internal input voltage line and the earth terminal, and a second NMOS transistor, which is connected between the gate of the NMOS transistor and the earth terminal, wherein gates of the first and second NMOS transistors are connected to the gate of the PMOS transistor in order to be made conductive by the input signal from the external unit, when the PMOS transistor is non-conductive, and vice versa.

15. The DC-DC converter according to claim 1, wherein at least the controller and the switch of a main block of the DC-DC converter are made in the same integrated circuit in CMOS technology.

16. The DC-DC converter according to claim 1, wherein the duty cycle d=Tn/T between the first period Tn of conduction of the switch and the oscillation period T of the oscillator decreases with an increase in period T, when the input voltage drops below a first low voltage threshold.

17. The DC-DC converter according to claim 16, wherein the first duration Tn increases, when the input voltage drops below a second low voltage threshold lower than the first voltage threshold.

18. The DC-DC converter according to claim 17, wherein the first voltage threshold is around 0.45 V, and wherein the second voltage threshold is around 0.3 V.

19. The DC-DC converter according to claim 17, wherein the monostable element transistors are made in wider dimensions than the oscillator transistors in order to obtain an increase in the first duration Tn with respect to an increase in the oscillation period T at a lower input voltage.

20. A method for actuation of a DC-DC converter according to claim 1, wherein the converter with low start-up power and voltage operates in discontinuous mode and includes an inductor for connection to a power source providing an input voltage to be converted, a switch connected to the inductor and controlled by a controller and a diode element connected to a connection node of the inductor and the switch to provide an output voltage, the method including the steps of:

controlling the conduction of the switch in a first phase by a control signal from the controller during a first duration Tn, which is determined by the monostable element of the controller to obtain an increasing current in the inductor, stopping the conduction of the switch in a second phase during a second duration Tp to induce a decreasing current in the inductor, which is transferred through the diode element to provide an output voltage, and once the current in the inductor is zero, a third neutral phase starts with no current entering or leaving the DC-DC converter until the end of a switching cycle period T of the switch, wherein the duty cycle d=Tn/T between the first duration Tn of conduction of the switch and the oscillation period T of the oscillator decreases when the input voltage decreases in order to obtain an increase in the input impedance of the DC-DC converter.

21. The method according to claim 20, wherein the duty cycle d decreases when the input voltage drops below a first voltage threshold with an increase in the oscillation period T and with no variation in the first duration Tn.

22. The method according to claim 21, wherein the first duration Tn increases, when the input voltage drops below a second voltage threshold lower than the first voltage threshold.

* * * * *